Aug. 29, 1933.  G. STAUBER  1,924,421
TURBINE ENGINE
Filed Feb. 27, 1932  2 Sheets-Sheet 1

Inventor
Georg Stauber
By C. P. Goepel
his Attorney

Aug. 29, 1933.    G. STAUBER    1,924,421
TURBINE ENGINE
Filed Feb. 27, 1932    2 Sheets-Sheet 2

Inventor
Georg Stauber
By C. P. Goepel
his Attorney

Patented Aug. 29, 1933

1,924,421

UNITED STATES PATENT OFFICE 1,924,421

TURBINE ENGINE

Georg Stauber, Berlin, Germany

Application February 27, 1932, Serial No. 595,586, and in Germany March 2, 1931

4 Claims. (Cl. 60—12)

This invention relates to turbine engines, and has for its general object and purpose to provide certain improvements in an engine of the type disclosed in the German Patent No. 533,541, whereby better transmission of power and higher efficiency in the operation of said engines will be obtained.

It is a more detail object of the invention to provide a turbine engine in which the power impulse is produced through the medium of incompressible liquid pistons under the pressure influence of the combustible gas mixture, steam, compressed air or the like, in which there is provided a rotor having combustion chambers and an outer ring having storage cells rotating as a unit with the rotor, together with an interposed stationary guide ring for the liquid pistons, and means whereby the areas of said storage cells are progressively increased and decreased to receive and discharge the liquid pistons therefrom in each revolution of the rotor.

More specifically, I provide the outer ring with movable blades or equivalent elements separating the storage cells from each other and so arranged and co-operating with the outer periphery of the guide ring that, in the event of failure of ignition of the gas mixture in one of the rotor chambers, the increase in area of the storage cells in the impulse movement of the pistons between the same and the rotor chambers will be only such as will insure the continuous and complete filling of the storage cell by the water piston influenced only by the effect of centrifugal force. Thus I avoid excessive loss or waste of water in the operation of the engine.

It is also a further object of the invention to provide means whereby the small remaining quantity of water in the combustion cells of the rotor at the end of the impulse movement of each water piston is exhausted, and an equivalent quantity of water supplied to each piston.

With the above and other objects in view, the invention consists in the improved turbine engine, and in the form, construction and relative arrangement of its several parts as will be hereinafter more fully described, illustrated in the accompanying drawings and subsequently incorporated in the subjoined claims.

In the drawings wherein I have disclosed one simple and practical embodiment of the invention, and in which similar reference characters designate corresponding parts throughout the several views,—

Figure 1:
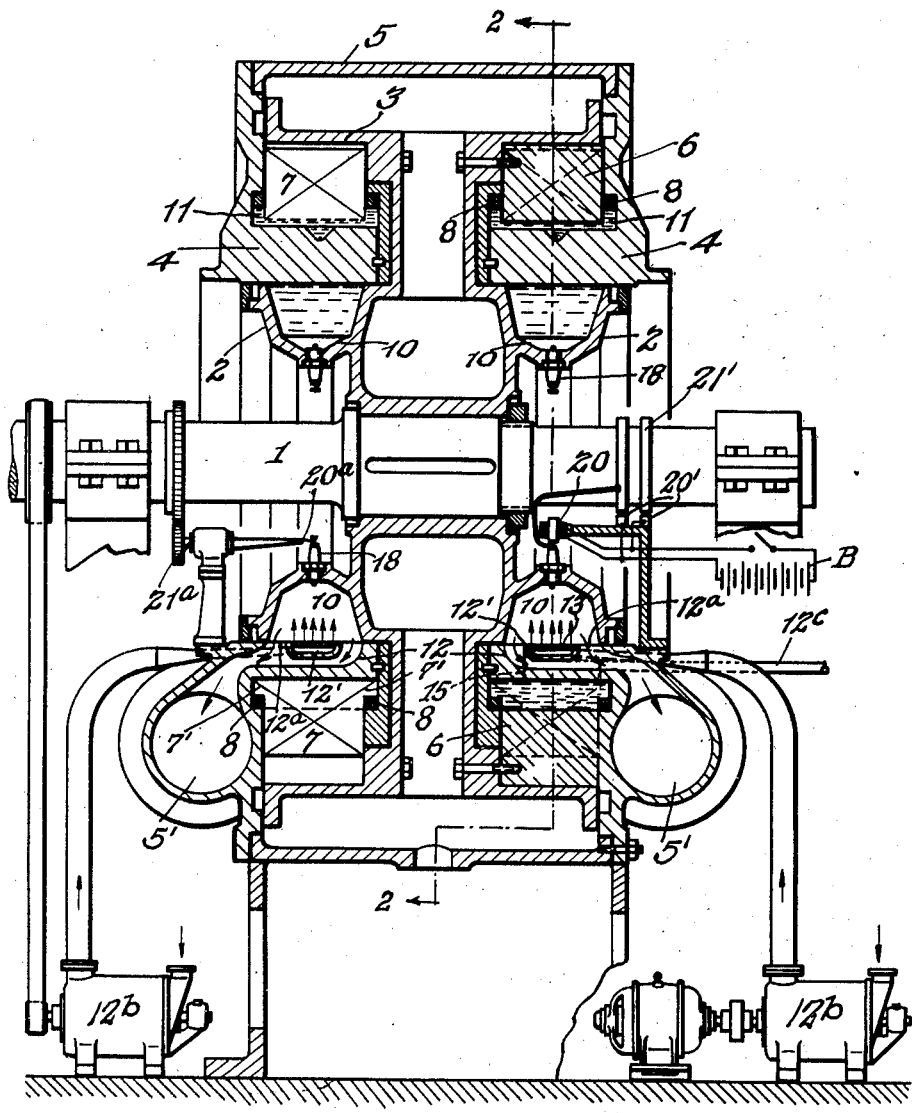
Figure 1 is a diametrical sectional view of a turbine engine showing one practical form of the invention taken substantially on the line 1—1 of Fig 2.

In the illustrated example of my invention, I secure upon the shaft 1 mounted in suitable supporting bearings, a drive wheel which may consist of two laterally spaced duplicate or complemental rotors 2. As herein shown, the opposed inner sides of these rotors are integrally connected with each other for convenient mounting on the shaft 1, but it will be understood that if desired only a single rotor may be used, or the twin rotors may be otherwise mounted upon the shaft 1, than as herein disclosed. Each of these rotors has opposite side walls connected by spaced radial blades or webs 9 forming the combustion chambers 10 of constant area.

An outer ring 3 is disposed in spaced concentric relation to each of the rotors 2, and as herein shown is integrally connected with the inner side wall of the rotor. Between each rotor 2 and the outer ring 3, a stationary guide ring 4 is interposed. As illustrated, these guide rings may be formed as integral parts of the engine casing 5, the inner peripheries of said guide rings being concentric with the respective rotors 2 and in substantial relative sliding contact with the outer peripheries of the rotors. The outer periphery of each guide ring 4 is, however, eccentric with relation to the inner ends of a plurality of closely spaced sections 6 of a suitable light self-lubricating metal which are fixed in the guide ring 3 by bolts or other suitable fastening or securing means. Between these metal blocks or sections 6, the blades 7 are slidably held for inward and outward movement relative to the periphery of the guide ring 4. The inner end of each blade 7 at its opposite side edges is formed with suitable lugs or projections 7' co-operating with the rings indicated at 8, which are mounted in each guide ring 4 in concentric relation to the outer periphery of said guide ring, and therefore in eccentric relation to the rotor 2 and the outer ring 3. Thus, it will be understood that in the rotation of the rotor and the ring 3, the blades 7 are constantly in sliding engagement at their inner ends upon the outer periphery of the guide ring 4. Thus, the water piston storage cells between the inner ends of the sections 6 and the eccentrically related outer periphery of the guide ring 4 constantly vary in area during the rotation of the rotor, such storage cells indicated at 11 progressively increasing in area on one side of the guide ring and progressively decreasing in area on the opposite side thereof.

Each of the guide rings 4 at the top thereof has a solid section, and at each side of said solid section is formed with a plurality of curved guide passages for the water pistons which are separated from each other by the blades or webs 16 and 17 respectively. Adjacent the lowermost passage formed by the blades 16, said guide ring is also provided with the water outlet or exhaust passage 12 leading to a suitable drainage conduit 5' on one side of the casing 5. Within this passage, a chamber 12' is formed to receive compressed air from a suitable source of supply 12b and is adapted to be discharged through the apertures 13 into the combustion chambers 10 of the rotor 2 to scavenge or expel the burned gases therefrom into the exhaust passage 12 through the opening indicated at 12a. The ring 4 is also provided with a water inlet channel 15 in communication with the several water storage chambers 11, and connected through the conduit indicated at 12c with a suitable source of water supply.

Beyond the exhaust passage 12 in the direction of rotation, the ring 4 is provided with the chamber 14 receiving a gaseous mixture under pressure from pump 14' through the supply pipe 14a. The gaseous mixture enters the several combustion chambers 10 of the rotor through the apertures 14b.

The rotor 2 is provided with a spark plug or other igniting device shown at 18 for each of the combustion chambers 10. Any suitable ignition circuit might be provided, but for this purpose, at the right in Fig. 1, I have shown a battery B having its poles connected to an ignition coil indicated at 20 and to spaced stationary contact members 20'. These contact members are respectively engaged by the spaced rings 21, 21' on the shaft 1, the ring 21 being insulated from said shaft and electrically connected with the central electrodes of the several spark plugs 18. The other side of the battery circuit is connected through the ring 21', shaft 1 of the rotor to the other electrodes of the spark plugs. However, the battery current is too weak to jump the gap between the electrodes and create a spark, until the central electrode of each plug is opposed to the ignition coil. The current passing through the central electrode of the plug is intensified so as to produce the necessary spark at the proper time. At the left in Fig. 1, an alternative ignition means is shown in the form of a small magneto 21a, one pole of which is suitably connected through the rotor with the shells of the spark plugs 18, while the other pole is connected with the element 20a adapted to engage the central electrodes of the spark plugs as they successively arrive at the explosion position to create the necessary spark.

Figure 2:
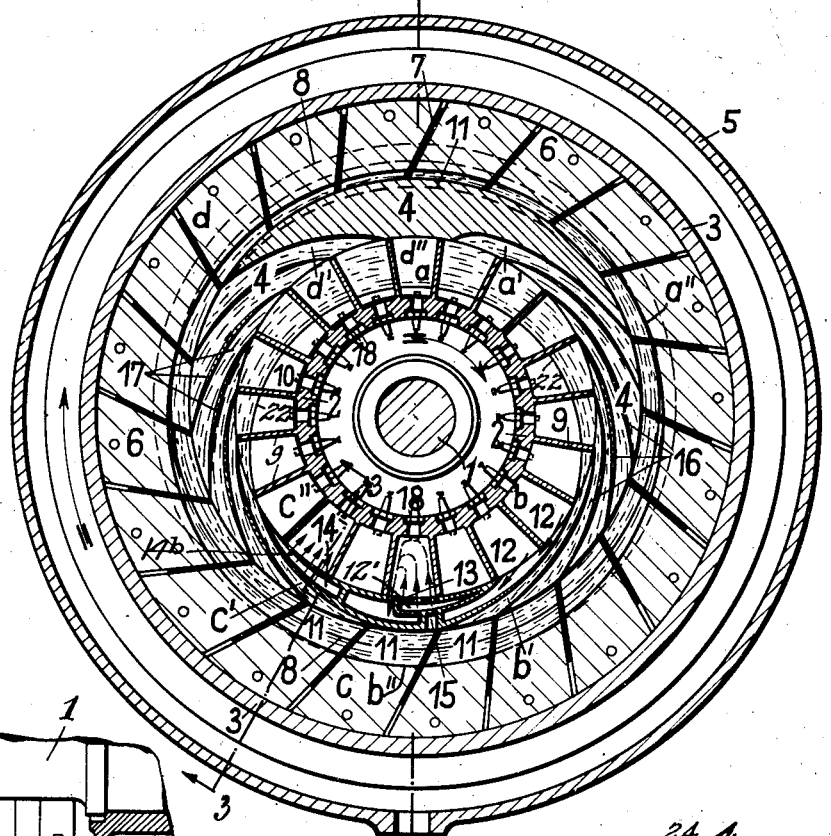
Fig. 2 is a vertical sectional view taken substantially on the line 2—2 of Fig. 1.
Figure 3:
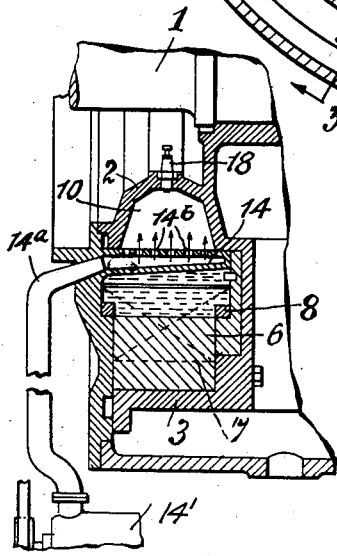
Fig. 3 is a detail sectional view taken on the line 3—3 of Fig. 2.

In operation of the turbine, when each combustion chamber 10 of the rotor 2 arrives at the position indicated at a with its outer open end substantially closed by the central upper portion of the ring 4, the gas mixture in the inner end of the chamber is under maximum compression. At this time, the spark plug circuit is closed so as to ignite said mixture. As a result of combustion and an expansion of the gases, in the passage of the outer end of the combustion chamber over the inner end of the channel or passage a' in the guide ring, the water piston is forced outwardly from the combustion chamber, through said passage and into the storage cell a'' of the ring. The combustion chamber of the rotor and the storage cell of the ring 3 successively register with the inner and outer ends of the remaining passages formed by the spaced blades 16 of the guide ring, said storage cell continually increasing in area to receive the outer portion of the water piston expelled by the expansion of the gas and centrifugal force from the combustion chamber of the rotor, such transference of the water piston concluding at the position b of the combustion chamber, the final discharge therefrom taking place through the passage b' of the guide ring and into storage cell b'' of the ring 3. The small remaining quantity of liquid in the chamber b of the rotor is exhausted or discharged therefrom through the passage 12. The combustion chamber 10 then comes into registration with the apertures 13 through which compressed air enters said chamber, thus expelling the burned gases therefrom through opening 12a into exhaust passage 12. As the rotor continues to rotate in the direction of the arrow shown in Fig. 2, the combustion chamber or cell thereof then receives a new charge of gaseous mixture through the apertures 14b.

The several blades 7 are now forced outwardly owing to the eccentric relation between the ring 4 and the ring 3, so that there is a progressively decreasing area of the storage cells 11 and the water pistons are forced therefrom through the passages formed by the blades 17 in the guide ring and into the combustion chambers 10 of the rotor 2, as the chambers successively move between the positions c, c', c'', and d, d' and d'', whereupon the cycle of operations is repeated. During the movement of the liquid out of the combustion chambers 10 of the rotor, the expansion forces of the combustion gases are effectively transferred to the shaft 1, partly through the effective flow through the passages formed by the blades 16 and reaction against the walls of the combustion chambers 10, and partly through the pressure effect against the blades 7 forming the storage cells of the ring 3. It will thus be evident that the distribution of eneregy depends upon the angular relation of the circumferentially spaced blades or walls of the chambers of the rotor 2 and ring 3 at opposite sides of the fixed guide ring 4.

It is an important feature of the invention, that the parts 6 and the blades 7 are so arranged relative to each other and with respect to the outer periphery of the guide ring 4, that in the event of failure of ignition in any one of the combustion chambers 10, there will be no excessive loss of the liquid. This is due to the fact that the progressive increase in area of the storage cells 11 is so related to the volume of the water piston that the speed of outward movement or flow of the water piston solely under the action of centrifugal force will insure the complete filling of the progressively enlarging cell 11, thus avoiding breaking off of the water piston and the retention of a comparatively large amount of water in the combustion chamber 10 when the latter registers with the exhaust or discharge passage 12.

Figure 4:
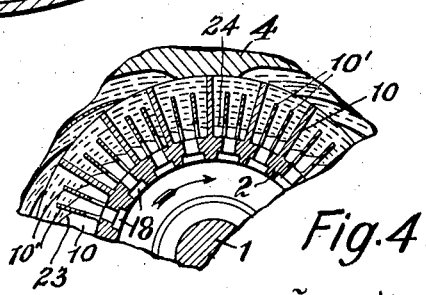
Fig. 4 is a fragmentary sectional view of the rotor showing a slightly modified form thereof.

As shown in Fig. 4 of the drawings, I may also provide each combustion chamber 10 of the rotor 2 with additional relatively short radially disposed ribs 10' to diminish the effect of radial and rotational velocity components on the surface of the liquid in said combustion chambers. Thus, as shown at 22 in Fig. 2, the surface of the liquid tends to assume under the action of centrifugal force and rotary movement of the liquid body, an angular or sloping position which, if continued, would result in adequate compression and thereby prevent the proper combustion of the gaseous mixture by flushing the spark plugs. However, by providing the ribs 10' this surface is broken up into the small angular surfaces 23 which do not extend to such an extent within the chambers as to produce the disadvantageous results above mentioned.

From the foregoing description considered in connection with the accompanying drawings, the construction, manner of operation and several advantages of my present invention will be clearly understood. It will be seen that I have devised an improved form of rotary turbine, utilizing the expansion effect of a combustible gas mixture upon liquid pistons for the direct transmission of power impulses to the engine shaft. An engine of this kind will be very economical in operation, and since the several parts thereof are of very rugged construction, maintenance cost incident to necessary repairs will be comparatively small. I have herein illustrated an example of my invention, which it is believed will give highly satisfactory results in actual practice. Nevertheless, it is to be understood that in so far as the essential features of my present disclosure are concerned, the same may also be embodied in various other alternative structural forms, and I accordingly reserve the privilege of resorting to all such legitimate changes therein as may be fairly embodied within the spirit and scope of the invention as claimed.

I claim:

1. In a turbine engine of the type in which power impulses are delivered to the engine shaft by liquid pistons having a constant aggregate volume, a rotor having radially disposed combustion chambers, an outer ring spaced from said rotor and rotating as a unit therewith, having storage cells for the liquid pistons and an interposed stationary ring between the rotor and said outer ring having guide passages connecting the combustion chambers of the rotor and the storage cells of said outer ring, and said outer ring being provided with means for progressively varying the area of said storage cells.

2. A turbine engine as described in claim 1, in which said means for varying the area of the storage cells consists of blades slidably mounted in said outer ring and in which the outer periphery of said guide ring is in eccentric relation to said rotor and substantially in contacting engagement with the inner ends of said blades.

3. A turbine engine as described in claim 1, in which the progressive increase in area of said storage cells of the outer ring is in such ratio relative to the aggregate volume of the water pistons as to substantially completely empty the combustion chambers of the rotor under the effect only of centrifugal force upon the water pistons.

4. A turbine engine as described in claim 1, in which the guide passages in said guide ring for the outward and inward flow of the water pistons to and from the combustion chambers of the rotor are arranged in series at diametrically opposite sides of the rotor, said ring between said two series of passages having an exhaust passage for draining the combustion chambers, and means for supplying an equivalent amount of water to the pistons in said storage cells.

GEORG STAUBER.